W. W. VOSPER.
POWER TRANSMISSION AND CONTROL MECHANISM.
APPLICATION FILED NOV. 18, 1912.
1,060,723.
Patented May 6, 1913.
3 SHEETS—SHEET 1.
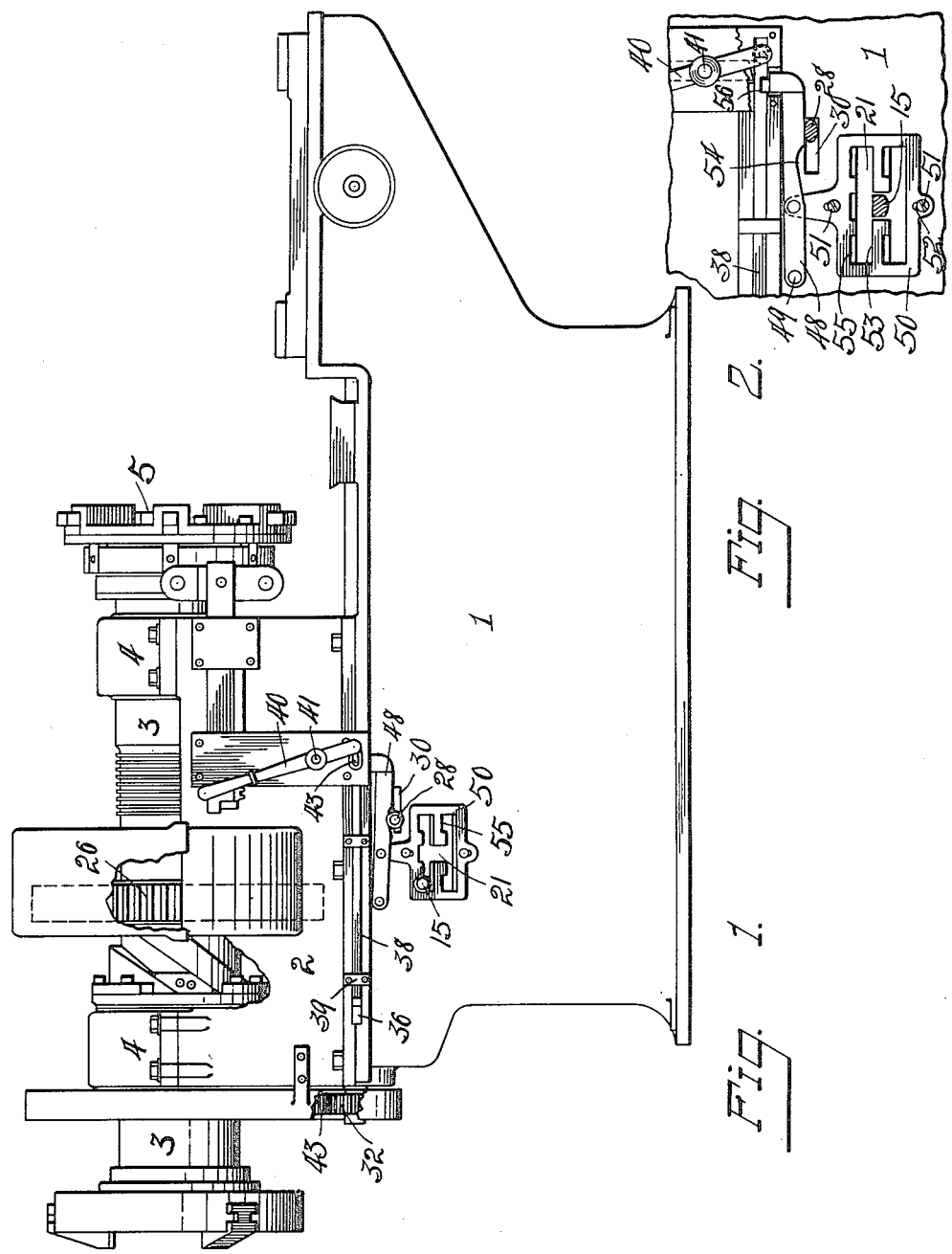
WITNESSES:
C. H. Bills.
E. E. Thomas.
INVENTOR.
William W. Vosper,
By Owen & Owen,
His attys.

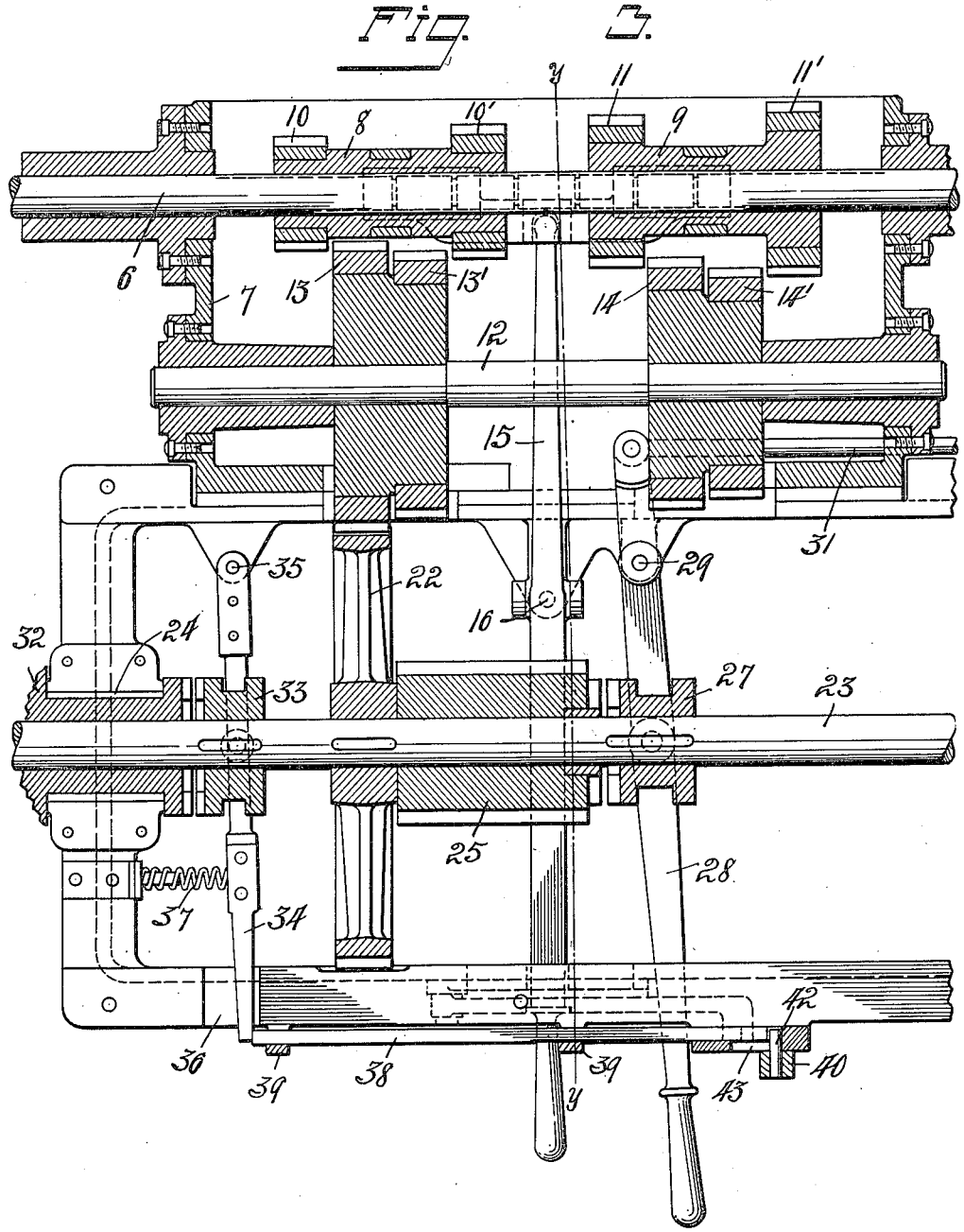

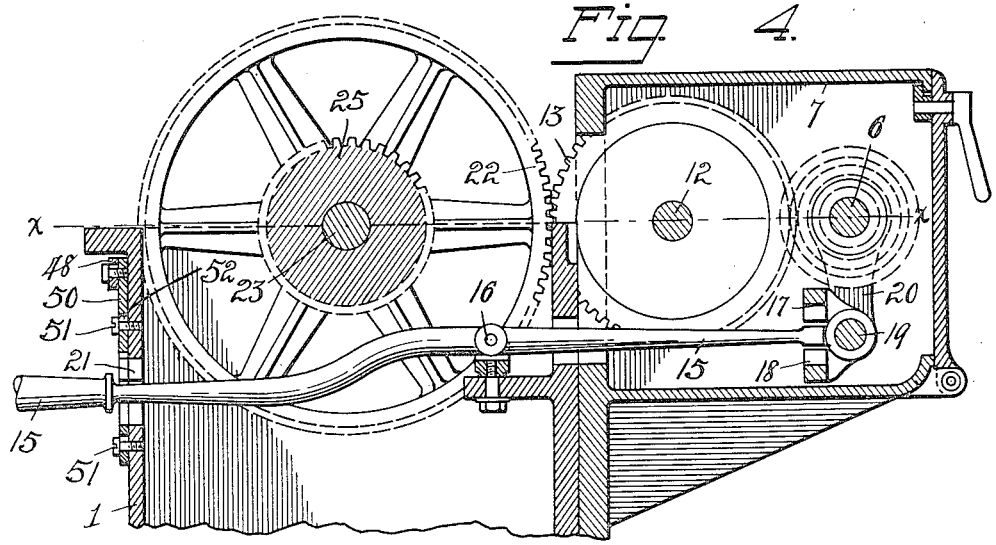
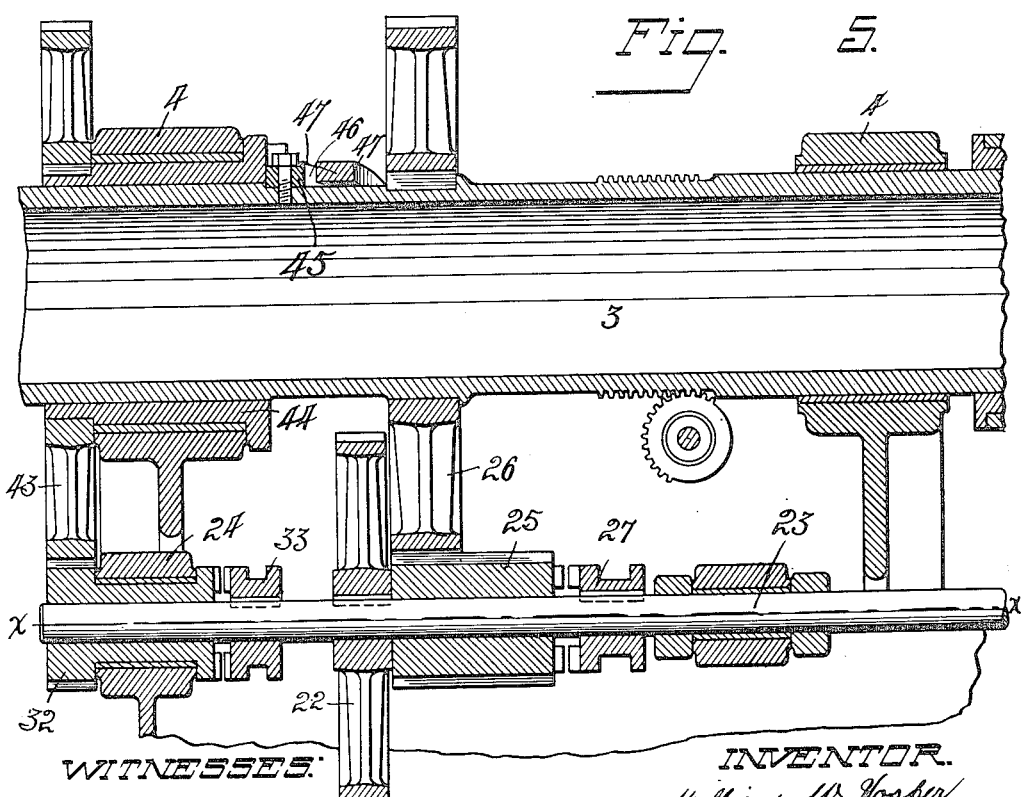

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

POWER TRANSMISSION AND CONTROL MECHANISM.

1,060,723. Specification of Letters Patent. Patented May 6, 1913.

Original application filed July 5, 1912, Serial No. 707,711. Divided and this application filed November 18, 1912. Serial No. 732,080.

*To all whom it may concern:*

Be it known that I, WILLIAM W. VOSPER, a citizen of the United States, and a resident of Toledo, in the county of Lucas and State of Ohio, have invented a certain new and useful Power Transmission and Control Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to power transmission mechanisms particularly designed for use in connection with a pipe threading machine for communicating both axial and rotary movements to the thread cutting parts, but is not restricted to such use as it may be used in any connection for which it may be adapted or appropriate, and is a division of an application filed by me on July 5, 1912, Serial No. 707,711.

The object of my invention is the provision of improved means for imparting at will an axial feeding movement to a rotating part.

A further object of the invention is the provision, in combination, with a variable speed power transmission mechanism, of means for preventing a changing of the speed of driving when the mechanism is in driving connection with the driven part.

A further object of the invention is the provision, in combination with a power transmission mechanism of the character described, of separate means for controlling the rotary and axial driving of the driven part, and also the provision of simple and efficient means for preventing a movement of one of such control means until the other has been moved, whereby to enhance the practicability and commercial value of mechanisms of this character.

The invention is fully described in the following specification, and while, in its broader aspect, it is capable of embodiment in numerous forms, a preferred embodiment thereof is illustrated in the accompanying drawings, in which,—

Figure 1 is a front elevation of a machine embodying the invention. Fig. 2 is an enlarged view of a portion of the control parts. Fig. 3 is an enlarged horizontal cross-section of a portion of the power transmission mechanism taken on the lines $x, x$ in Figs. 4 and 5. Fig. 4 is a vertical cross-section taken on the line $y, y$ in Fig. 3, and Fig. 5 is a partial longitudinal section of the mechanism taken on the vertical center line of the driven part.

Referring to the drawings, 1 designates the hollow base frame of a machine embodying the invention, and 2 a rectangular frame part rising from the left end portion thereof. A shaft or barrel 3 which constitutes the driven part or member of the invention, is mounted longitudinally of the frame in bearings 4—4 provided in the ends of the frame part 2, and, in the present instance, is shown as carrying a thread cutting mechanism 5 at one end thereof.

The drive shaft of the mechanism embodying my invention is designated 6, and is journaled in the opposite ends of a housing or case 7 in parallel relation to the shaft 4 and receives its power from any suitable source, said housing being attached, in the present instance, to the rear side of the frame 1—2. A change speed gearing is mounted in the housing 7, and is shown as comprising two sleeves 8 and 9, which in turn fixedly carry the spaced pinions 10—10' and 11—11', respectively, of different diameters. A second shaft 12 is mounted in the housing 7 in parallelism with the shaft 6, and carries gears 13 and 13' for mesh respectively with the pinions 10 and 10', and also carries gears 14 and 14' for mesh respectively with the pinions 11 and 11'. The sleeves 8 and 9 are feathered to the shaft 6, and their shifting movements are controlled by a lever 15, which is fulcrumed to the frame 1, as at 16, for both horizontal and vertical rocking movements, and has its forward end projected through the front side of said frame. The inner end of the lever 15 is adapted to be swung upward or downward from neutral position into respective engagement with forked fingers 17 and 18, which are mounted for axial shifting movements on a shaft 19, that is mounted in the housing 7 below the shaft 6. Each finger 17, 18 has an arm 20 projecting upward therefrom, with the arm of one in forked engagement with the sleeve 8 and the arm of the other in forked engagement with the sleeve 9, whereby shifting movements of such fingers impart corresponding shifting movements to the sleeves with which they respectively connect. It is thus evident that the pinions on the shaft 6 may be selectively shifted into engagement with the respective gears on the shaft 12 by shifting movements of the control-lever 15, as the desired speed of driving the driven member or shaft 3 may require.

The outer end of the control lever 15 works, in the present instance, through an H-slot form of guide 21 in the front side of the base frame 1, as shown in Figs. 1 and 2. This guide is adapted to coact with the lever to guide the shifting movements thereof, as is well understood in the art.

One of the gears on the shaft 12, the gear 13 in the present instance, meshes with a gear 22 on the shaft 23, which shaft is journaled longitudinally of the base frame 1 in suitable bearings 24 provided therein. This shaft carries a loose gear 25 in mesh with a gear 26, which is keyed to the driven shaft 3. A movable clutch member 27 is mounted for axial shifting movements on the shaft 23 and is adapted to be moved into or out of clutch engagement with the adjacent end of the gear 25 by movements of a shift-lever 28, which is fulcrumed to the frame, as at 29, and has its free end projecting horizontally without the front side of the base frame 1 through a slot 30 therein. The opposite or rear end of the lever 15 is projected beyond its fulcrum and has connection through a rod 31 with parts which form no part of the present invention and will therefore not be described.

The outer left hand end of the shaft 23 has a pinion 32 loosely mounted thereon without the base frame 1, said pinion having a sleeve projecting therefrom through the adjacent bearing 24 and provided at its inner end with a clutch-surface with which a movable clutch member 33, on the shaft 23, may be engaged.

A shift-lever 34 for the clutch member 33 is fulcrumed to a frame part at the rear of such member, as at 35, and has its forward end projected through a slot 36 in the front side of the frame. The lever 34 is normally held in clutch released position by the action thereon of a spring 37, and is shifted to clutch engaging position by a movement to the left of a slide-bar 38, which is mounted in guides 39 at the front side of the frame, with its left-hand end in contact with the outer end of the lever 34, as best shown in Fig. 3.

A control lever 40 for the shift bar 38 is fulcrumed to the front side of the frame, as at 41, and has a pin 42 projecting inward from its lower end through a slot 43 in the frame in position to have lateral contact with the right hand end of the bar 38. It is apparent with this arrangement of clutch control that a shifting of the upper end of the lever 40 to the right will move the bar 38 and shift-lever 34 from normal positions and effect an engagement of the clutch member 33 with its companion to communicate rotation from the shaft 23 to the gear 32.

The gear 32 meshes with a gear 43, which is keyed to a sleeve 44 that loosely encircles the driven shaft 3 and projects from said gear through the adjacent bearing 4, being radially flanged at its opposite ends to act against the ends of the bearings 4 in opposition to the gear 43 to anchor such gear and sleeve against longitudinal movements relative to the frame. The connection between the sleeve 44 and shaft 23 is such as to cause the sleeve to rotate at a slightly different speed from the shaft 3, and this feature, in conjunction with a fixed block 45 on the shaft 3 working in a spiral groove 46, which is formed by the parts 47—47 that are bolted or otherwise suitably attached to the inner end of the sleeve 44 (see Figs. 1 and 5), causes the shaft 3 to feed slightly forward or to the right, when both gears 26 and 43 are being driven in one direction. In the present instance, the gear 43 has one less tooth than the gear 26 to make the desired difference in the speed of driving of the shaft 3 and sleeve 44.

In order to render it necessary to set the change speed mechanism for the desired speed of driving the shaft 3, as for instance to suit the diameter of the pipe to be threaded, before throwing either clutch member 27, 33 into engagement with its companion, I provide a simple lock mechanism for such purpose. This mechanism (see Figs. 1, 2 and 4) comprises a horizontally-disposed arm 48, which is pivoted to the front of the machine frame, as at 49, and extends over the H-slot 21 and rests adjacent to its free end upon the lever 28. A plate 50 is suspended from the arm 48 for vertical movements therewith, being guided in such movements by screws 51, projecting from the frame through registering vertically-disposed slots 52 therein, said plate having a guide slot 53 therein, which is of similar shape to and registers with the guide slot 21 in the frame, and when the plate is in the raised position shown in Fig. 2, the control-lever 15 for the shift gears of the change speed mechanism can be moved into any of the arms of the H or other suitable form of slot, which is provided by the slots 21 and 53 in the frame 1 and plate 50. When the lever 28 is shifted to throw the clutch 27 into engagement with its companion, such lever moves into register with a notch or under-cut 54 in the arm 48, thus permittting said arm and the plate 50 carried thereby to lower into position to lock the lever 15 in shifted position due to an associated notch or recess 55, one of which is provided in the upper wall of each of the arms of the slot 53, moving down over the lever 15, as indicated in Fig. 1, thus locking the lever against movement from such position until the plate 50 has been raised for such purpose. The arm 48 in addition to coöperating with the plate 50 to lock the lever 15 in shifted position, also has the free end thereof turned upward or provided with an upstanding lug which is adapted to enter a registering notch 56 (see Fig. 2) in the shift-bar 38 when such arm is in the elevated position in which it is held by the lever 28 when not in engagement with its clutch, thus preventing a shifting of the bar 38 to throw its clutch 33 into engagement with its companion until the lever 28 has first been thrown to place its clutch into engagement.

It is evident from the above that in the operation of the mechanism shown, the operator must first set the speed change control-lever 15 for the desired speed of driving of the shaft 3, after which the lever 28 is moved to the left to place the clutch-member 27 into engagement with its companion to effect a driving of the shaft 3 from the shaft 23, which latter is in turn driven from the drive shaft 6 through the intermediate speed change mechanism provided for such purpose. The movement of the lever 28 to clutch engaging position permits the arm 48 and attached lock plate 50 to lower, due to the lever moving into register with the recess 54 in the lower edge of said arm, thus effecting a locking of the speed change lever 15 in shifted position by reason of the registering recess 55 in the lock plate moving outward thereover. The lowering of the arm 48 also withdraws the upturned end thereof from locking engagement with the notch 56 in the shift bar 38 to render such bar free to be shifted by a movement of the control lever 40 to throw the clutch 33 into engagement with the clutch end of the pinion 32 for the purpose of driving the gear 43 and feed sleeve 44 to which it is attached. The driving of the shaft 3 and feed sleeve 44 in this manner at slightly different speeds, due to the difference between their respective driving connections with the drive shaft 23, causes a slow forward feeding of the shaft 3 while being rotated due to the block 45 that is carried by said shaft working in the groove 46 of the sleeve. While the combined rotary and axial movements which are thus imparted to the shaft 3 may be utilized in connection with different machines, they are primarily intended for use in connection with a pipe threading machine to impart both rotary threading and axial feeding movements to the threading mechanism as fully described in my former application Serial No. 707,711, of which the present one is a division.

I wish it understood that my invention is not limited to any specific construction or arrangement of the parts except in so far as such limitations are specified in the claims.

Having thus described my invention, what I claim as new, and desire to secure by Letters Patent, is,—

1. In combination, a driven shaft, a variable speed power transmission mechanism, a control member for said mechanism, means for communicating rotation to the shaft from said mechanism, a control member for said means, and means for locking the control member of the variable speed mechanism against shifting movements when the control member for such shaft driving means is in one position of its movement.

2. In combination, a shaft, a variable speed power transmission mechanism for said shaft, control means for the speed change gears of said mechanism, means operable to place said mechanism into or out of driving connection with the shaft, and means automatically operable to prevent the movement of said speed change control means when the shaft is being driven.

3. In combination, a driven part, a variable speed driving mechanism for said part, a speed control lever for said mechanism, a multiple-way guide means for said lever, means controlling the driving connection between said part and mechanism, and means automatically operable to lock said lever against shifting movements when said part is being driven.

4. In combination, a driven part, a variable speed drive mechanism for said part, a speed control lever for said mechanism, a multiple-way guide means for said lever, a clutch control lever for said mechanism, and means having a part coacting with said clutch control lever and a part coacting with said speed control lever to lock the latter in shifted position when the clutch control lever is in clutch engaging position.

5. In combination, a driven part, a variable speed power transmission mechanism for said part, a speed-control lever for said mechanism, a lever operable to connect or disconnect said mechanism and shaft, slotted guide means for said speed control lever, said guide means having parts which are relatively movable to coöperate to lock the speed control lever against shifting movements, and means controlled by movements of said other control lever for relatively moving said guide parts.

6. In combination, a driven part, variable speed drive mechanism therefor, a speed control lever for said mechanism, a control lever operable to connect or disconnect said mechanism and shaft, a multiple-way guide for said speed control lever, means movable relative to said guide means to lock the speed control lever in shifted position and having its movements automatically controlled by movements of said second lever whereby the speed control lever must be shifted first and is locked in shifted position by a clutch engagement movement of the other lever.

7. In combination, a rotatably and axially movable part and mechanism for imparting simultaneous rotary and axial movements to said part and having separate means for controlling the respective movements of said part.

8. In combination, a rotatably and axially movable part, a change speed mechanism for communicating rotary and axial movements to said part and having change speed control means, and separate means for controlling the rotary and axial movements of said part.

9. In combination, a pair of parts mounted for relative rotary and axial movements and having connection whereby said parts are caused to have relative movements when relatively rotated, and mechanism for imparting relative rotation to said parts and having independent control means therefor.

10. In combination, a drive shaft, a pair of concentric parts mounted for relative rotary and axial movements and having connection to cause them to have relative axial movements when relatively rotated, and mechanism for imparting relative rotary movements to said parts from said shaft and having independent control means therefor.

11. In combination, a pair of parts mounted for relative rotary and axial movements and having connection to cause them to have relative axial movements when relatively rotated, and a change speed mechanism for communicating relative rotary movements to said parts, said mechanism having independent means for controlling the change of speed and the driving of both of said parts.

12. In combination, a pair of parts mounted for relative coaxial rotary and axial movements, connection between said parts for causing them to have relative axial movements when relatively rotated and change speed mechanism for communicating relative rotary movements to said parts, said mechanism having control means for changing the speed of driving of said parts, and separate means for controlling the communicating of rotation to each of said parts from said mechanism.

13. In combination, a rotatably and axially movable part, and independently controlled means for imparting rotary and axial movements to said part.

14. In combination, a rotatably and axially movable part, and independently controlled variable speed means for imparting simultaneous rotary and axial movements to said parts.

15. In combination, a pair of parts mounted for relative rotary and axial movements, connection between said parts for causing them to have relative axial movements when relatively rotated, and independently controlled means for imparting rotation to the respective parts at different speeds.

16. In combination, a rotatably and axially movable part, independently controlled means for imparting rotary and axial movements to said part, and means automatically operable for preventing the stopping of the part driving action of one of said means while the other means is in driving connection with the part.

17. In combination, a rotatably and axially movable part, means for imparting rotary movements to said part, means for imparting axial movements to said part, said two means having parts thereof in common, and means operable to prevent the rotary driving action of said part when the other means is in driving connection with the part.

18. In combination, a rotatably and axially movable part, independently controlled variable speed means for imparting rotary and axial movements to said part, and means operable to prevent a stopping of the part driving action of one of said means while the other means is in driving connection with the part.

19. In combination, a rotatably and axially movable member, means for imparting rotary movements to said member, means for imparting axial movements to said member, independently operable control parts for said two means, and means automatically operable to lock one of said control parts against movement to member driving position until the other part has been moved to its member driving position.

20. In combination, two members mounted for relative rotary and axial movements, said members having parts which coact to cause the members to have relative axial movements when relatively rotated, separately operable drive means for said members, and means operable to prevent a stopping of the member driving action of one of said means when the other means is in driving connection with its member.

21. In combination, two members mounted for relative rotary and axial movements, said members having parts coacting to cause the members to have relative axial movements when relatively rotated, separately operable drive means for said members, separate control parts for said drive means, and means operable to lock one of said control parts in operative position until the other control part has been moved from its operative position.

22. In combination, a member mounted for rotary and axial movements, a power transmission mechanism, manually controlled means for communicating rotation to said member from said mechanism, manually controlled means for communicating axial movements to said member from said mechanism when the member is being rotated, and means operable to lock one of said member driving means in operative position when the other of said member driving means is in operation.

23. In combination, a rotatably and axially movable shaft, a variable speed transmission mechanism, manually controlled means for communicating rotation to said member from said mechanism, manually controlled means for communicating axial movements to said member from said mechanism when the member is being rotated, and means automatically operable to prevent a shifting of the speed change mechanism and a disengaging and stopping of the member driving action of the means which imparts axial movements to the member when the means which imparts rotary movements to said member is in operation.

24. In combination, a rotatably and axially movable member, a variably-speed power transmission mechanism, manually controlled means for communicating rotation to said member from said mechanism, manually controlled means for communicating axial movements to said member from said mechanism when the member is being rotated, and means automatically operable to prevent a shifting of the speed change mechanism and a movement of the last mentioned control means from operative position when the first mentioned control means is in its operative position.

25. In combination, a rotatably and axially movable member, a variable-speed power transmission mechanism having multiple connection with said member for imparting rotation thereto and also imparting axial movement to said member when being rotated, a speed control lever, control levers for said connections, and means operable to lock the speed control lever and one of said connection control levers in operative position when the other of said connection control levers is in its operative position.

26. In combination, a pair of members mounted for relative rotary and axial movements, a connection between said members for causing them to have relative axial movements when relatively rotated, mechanism having driving connection with each of said members for rotating the same, a control lever for each of said connections, and means operable to lock one of said control levers in operative position when the other is in its operative position.

27. In combination, a pair of members mounted for relative rotary and axial movements, connection between said members for causing them to have relatively axial movements when relatively rotated, a variable-speed power tarnsmission mechanism having separate driving connection with each of said members for imparting rotation thereto, a speed control lever, a separate control lever for each of said connections, and means operable to lock the speed control lever and one of said connection control levers in operative position when the other of said connection control levers is in its operative position.

28. In combination, a driven part mounted for rotary and axial movements, a speed-change power transmission mechanism having multiple connection with said part for imparting rotary movements thereto and imparting axial movements thereto when being rotated, means for shifting the speed change parts of said mechanism, and separate means for controlling the separate connections between said mechanism and driven part.

29. In combination, a drive shaft and a driven shaft, the driven shaft being mounted for rotary and axial movements, means movable relative to said driven shaft for communicating axial movements to said driven shaft when being rotated, and power transmission mechanism actuated by the drive shaft and having separately controlled connections with the driven shaft and said means for imparting relative rotary movements thereto.

30. In combination, a drive shaft, a driven member mounted for rotary and axial movements, a rotatable part having connection with said member for imparting axial movements thereto when the member and part are relatively rotated, and power transmission mechanism actuated by said drive shaft and having separately controlled driving connection with said member and part for imparting relative rotation thereto.

31. In combination, a drive shaft, a driven member mounted for rotary and axial movements, a rotatable part having connection with said member to impart axial movements thereto when the member and part are relatively rotated, and a change speed power transmission mechanism actuated by said drive shaft and having separately controlled driving connections with said member and part for imparting relative rotation thereto.

32. In combination, a drive shaft, a driven shaft, a sleeve concentric to said driven shaft and having connection therewith for causing the driven shaft and sleeve to have relative axial movements when relatively rotated, and a multiple speed power transmission mechanism actuated by said drive shaft and having driving connection with each said driven shaft and sleeve to impart relative rotation thereto, and separate means for controlling the respective connections between said mechanism and the driven shaft and sleeve.

33. In combination, a drive shaft, a driven member, rotatable means having connection with said member for imparting axial movements thereto when said means and member are relatively rotated, a power transmission mechanism actuated by said drive shaft, and having separately controlled driving connections with said member and means for communicating relative rotation thereto, and means for preventing a breaking of one of said power transmission connections until the other of said power transmission connections is broken.

34. In combination, a drive shaft, a pair of members mounted for relative rotary and axial movements and adapted to have relative axial movements when relatively rotated, power transmission mechanism driven by said shaft and having separately controlled driving connections with each of said members for imparting relative rotation thereto, and means for preventing a breaking of one of said connections until the other of the connections has been broken.

35. In combination, a drive shaft, a pair of driven members mounted for relative rotary and axial movements when relatively rotated, a multiple speed power transmission mechanism actuated by said shaft and having separately controlled driving connection with each of said members to communicate relative rotation thereto, change speed control means for said mechanism, and means for locking said control means and one of said mechanism connections in operative position when the other of said connections is in its operative position.

36. In combination, a drive shaft, a rotatable member, a driven shaft intermediate said drive shaft and member, variable speed means for communicating rotation from the drive shaft to the driven shaft and separately controlled means for communicating both rotary and axial movements to said member from a rotation of said driven shaft.

37. In combination, a drive shaft, a pair of members mounted for relative rotary and axial movements and connected to cause them to have axial movements when relatively rotated, a driven shaft, a multiple speed transmission mechanism between said drive and driven shafts, and separately controlled driving connections between the driven shaft and said members to communicate relative rotation thereto from a rotation of said driven shaft.

In testimony whereof, I have hereunto signed my name to this specification in the presence of two subscribing witnesses.

WILLIAM W. VOSPER.

Witnesses:
   C. W. OWEN,
   S. T. KLOTZ.